United States Patent
Hawn et al.

(10) Patent No.: US 6,830,010 B2
(45) Date of Patent: Dec. 14, 2004

(54) QUALITY ASSURANCE PROGRAM AND METHOD FOR MEAT PRODUCTION

(75) Inventors: Raymond Hawn, Hutchison, KS (US); Robert W. Balding, McPherson, KS (US)

(73) Assignee: Heartland Premium Beef, Inc., Hutchison, KS (US)

( * ) Notice: Subject to any disclaimer, the term of this patent is extended or adjusted under 35 U.S.C. 154(b) by 18 days.

(21) Appl. No.: 10/278,875

(22) Filed: Oct. 22, 2002

(65) Prior Publication Data

US 2004/0074446 A1 Apr. 22, 2004

(51) Int. Cl.⁷ .............................................. A01K 29/00
(52) U.S. Cl. ...................................................... 119/174
(58) Field of Search ........................... 119/14.01–14.03, 119/906, 174

(56) References Cited

U.S. PATENT DOCUMENTS

| | | | |
|---|---|---|---|
| 4,532,892 A | 8/1985 | Kuzara | |
| 5,315,505 A * | 5/1994 | Pratt et al. | 600/300 |
| 5,673,647 A | 10/1997 | Pratt | |
| 5,803,906 A * | 9/1998 | Pratt et al. | 600/300 |
| 5,867,820 A | 2/1999 | Cureton et al. | |
| 5,964,656 A | 10/1999 | Lawler, Jr. et al. | |
| 5,996,529 A | 12/1999 | Sissom et al. | |
| 6,000,361 A * | 12/1999 | Pratt | 119/51.02 |
| 6,135,055 A | 10/2000 | Pratt | |
| 6,196,912 B1 | 3/2001 | Lawler, Jr. et al. | |
| 6,211,789 B1 * | 4/2001 | Oldham et al. | 340/573.3 |
| 6,318,289 B1 * | 11/2001 | Pratt | 119/51.02 |
| 6,342,839 B1 * | 1/2002 | Curkendall et al. | 340/573.3 |
| 6,443,093 B1 * | 9/2002 | van der Lely et al. | 119/14.01 |
| 6,664,897 B2 * | 12/2003 | Pape et al. | 340/573.3 |

FOREIGN PATENT DOCUMENTS

WO     9945761     9/1999

* cited by examiner

*Primary Examiner*—Thomas Price
(74) *Attorney, Agent, or Firm*—Hovey Williams LLP

(57) ABSTRACT

A quality assurance program for consistently producing high quality meat products broadly comprises selecting a plurality of calves that meet a set of standards and managing the calves according to a set of protocols. The standards are used to cull out low quality calves that are expected to yield low quality meat products. The protocols ensure the calves are properly nurtured so that they may yield high quality meat products by dictating how the calves are fed and treated. For example, the protocols preferably dictate what and when vaccines are given to the calves. The program may be broken down into three growth phases, such as an initiation phase in which the calves are managed during their first weeks, a growth phase in which the calves are managed during their growth, and a finishing phase in which the calves are managed leading up to slaughter.

16 Claims, 3 Drawing Sheets

QUALITY ASSURANCE PROGRAM AND METHOD FOR MEAT PRODUCTION

BACKGROUND OF THE INVENTION

1. Field of the Invention

The present invention relates to quality assurance programs and methods. More particularly, the present invention relates to a quality assurance program and method for consistently producing high quality meat products.

2. Description of Prior Art

Today's meat products suffer from several disadvantages. One is that most meat products are treated as commodities and their price is largely market driven. Market forces tend to reduce the quality of meat products and lead to other disadvantages, such as inconsistency.

Inconsistency and poor quality can both be traced to current methods of livestock breeding and meat production. For example, cattle currently used in meat production typically have inconsistent genetics, since they are commonly bred from a diverse cattle population. Additionally, there may be little consistency in how cattle are fed and treated, since different cattle owners commonly follow different protocols and procedures. Furthermore, cattle typically have inconsistent physical characteristics, such as size and weight, which commonly results from the above described variations. Inconsistent new born calves combined with inconsistent feeding and treatment inherently leads to inconsistent meat products.

Each time consumers experience poor quality in other types of foods and products, those consumers are driven to avoid certain brands for their next purchase. However, the same cannot be done with meat products because meat products are typically not branded. Therefore, consumers currently have no way of gauging quality of current meat products until after they have been purchased and prepared. Thus, consumers have no reason to seek specific brands.

Accordingly, there is a need for an improved quality assurance program that overcomes the limitations of the prior art.

SUMMARY OF THE INVENTION

The present invention overcomes the above-identified problems and provides a distinct advance in the art of quality assurance programs and methods. More particularly, the present invention provides a quality assurance program and method for consistently producing high quality meat products. The program broadly comprises selecting a plurality of calves, or other animals, that meet a set of standards and managing the calves according to a set of protocols. The set of standards preferably include initiation standards and growth standards that are used to cull out low quality calves expected to yield low quality meat products. If, at any point, any of the calves fail to meet the standards, that calf is preferably removed from the program. Thus, only calves of high quality are admitted into and remain with the program. The set of protocols preferably include an initiation protocol, a growth protocol, and a finishing protocol to ensure the calves are properly nurtured so that they may yield high quality meat products.

The program may be broken down into three growth phases, such as an initiation phase in which the calves are managed during their first weeks, a growth phase in which the calves are managed during their growth, and a finishing phase in which the calves are managed leading up to slaughter. The initiation phase preferably occurs at a calf ranch where the calves are born and includes selecting only calves that meet the initiation standards.

The initiation standards preferably include requirements relating to the calves' genetics. For example, the calves are preferably selected from a preferred breed of cattle that has been bred with consistent genetics, such as a dairy breed. More specifically, Holstein cattle have been bred for specific physical characteristics, such as milk production and stature. Breeding specifically for these characteristics has produced consistent genetics and made currently available Holstein cattle the preferred breed for use with the program.

The calves are also preferably selected according to other requirements specified in the initiation standards. For example, the calves preferably meet a minimum birth weight of approximately eighty-five pounds, which is an indicator of the calves' health. Other indicators of health may also be used as requirements and included in the initiation standards.

While at the calf ranch, the calves are preferably managed according to the initiation protocol which preferably dictates how the calves are fed. For example, each calf is preferably removed from its mother and fed four quarts of a high quality colostrum within thirty minutes of birth. The calves are preferably fed two more quarts of the colostrum during the first twenty-four to thirty-six hours of birth. Beginning on day three, the calves are preferably given a milk replacer, a starter feed, and access to water. During these early days, the calves are preferably prevented from feeding on forage.

The initiation protocol may also dictate that the calves are weaned when they consume at least one and one half pounds of the starter feed for at least three consecutive days. The calves are preferably not moved for at least five days after weaning, in order to prevent them from becoming agitated.

The initiation protocol also preferably dictates vaccinations and other treatments given to the calves within the first twenty-four hours. For example, the calves are preferably vaccinated for diseases caused by bacteria, such as *e.coli, salmonella, pasteurella*, and viral infections. Each calf's naval is preferably dipped in a seven percent iodine solution in order to prevent naval infections. Blood samples are also preferably taken from each calf in order to perform a blood protein serum analysis. The calves are also preferably weighed and tagged with all relevant information relating to the calves being recorded.

The initiation protocol preferably also dictates other vaccinations and treatments be given to the calves at other times. For example, the calves are preferably castrated and dehorned on their tenth day. The calves are preferably vaccinated for diseases caused by Infectious Bovine Rhinotracheitis, Bovine Virus Diarrhea, Parainfluenza, and Bovine Respiratory Syncytial Virus on their thirtieth day. The calves are also preferably vaccinated for respiratory disease caused by *Pasteurella Haemolytica* and *Pasteurella Multocida* on their thirtieth day. The calves are preferably vaccinated for diseases, such as Blackleg, Malignant Edema, Black disease, and Enterotoxemia on their forty-fifth day.

The initiation protocol preferably also dictates other practices, such as socializing the calves, once they have been weaned. Additionally, each calf is preferably weighed and the information relating to each calf is preferably updated just before shipment to the grow-yard where the calves begin the growth phase.

Once the calves arrive at the grow-yard, they are preferably treated according to the growth protocol. For example, the calves are preferably immediately unloaded and inspected for illness or injury. Feed and water are also preferably immediately made available to the calves. If the calves are to be kept in bunks, then eight pounds of the grower feed is preferably made available in each bunk. Alternatively, if the calves are to be kept in pens, then self-feeders in the pens are preferably stocked with the grower feed.

The growth protocol preferably also dictates vaccinations and treatment for the calves' first forty-eight hours after arrival and other times, such as after approximately two weeks at the grow-yard. The growth protocol may also dictate that the calves are weighed frequently and the information relating to each calf is updated frequently, to insure the calves continue to meet the growth standards. Once the calves consistently maintain a growth rate, they may be shipped to a finishing-yard where they begin the finishing phase.

The finishing protocol preferably dictates vaccines and treatment given to the calves approximately forty-eight hours after arrival at the finishing-yard. For example, the calves are preferably weighed and the information relating to each calf is updated. Additionally, the calves are preferably implanted with an antibiotic implant approximately ninety days before being slaughtered. The finishing protocol may also dictate how the calves are slaughtered and how the resulting meat products are handled.

As discussed above, the information relating to the calves is preferably updated each time some action is taken with respect to the calves. The information is preferably recorded individually and reflects each calf's entire history from their birth to being loaded for transportation to a slaughter facility. While it is possible to record and store the information in paper files, the information is preferably recorded and stored in a computer-based livestock information system, making the information easy to analyze and share. Analyzing the information allows for easy discrimination of poor and under performing calves so that they may be culled out in order to ensure only high quality meat products are produced through the program. Sharing the information allows interested parties to research histories of meat products they purchase and/or consume.

Consistently selecting and managing calves according to the program consistently produces high quality meat products and elevates those meat products above simple commodities. Additionally, quality conscious consumers want to be assured of quality. Thus, documenting the calves' progression through the program in a manner that allows such consumers to access the information, assures those consumers that they are purchasing high quality meat products building product name recognition and brand loyalty.

In use, calves of the selected breed, are preferably weighed and then fed four quarts of the colostrum substantially immediately after birth. Calves are preferably selected according to the initiation standards, which preferably includes requirements such as the minimum birth weight. If the calves meet the minimum birth weight, and any other requirements of the initiation standards, they are admitted into the program. During the initiation phase, the calves are preferably fed and treated according to the initiation protocol. Information relating to each of the calves is also gathered during the initiation phase.

After the initiation phase, the calves are preferably shipped to the grow-yard, where they are fed and treated according to the growth protocol. The calves are preferable weighed at approximately twelve weeks of age, seventeen weeks of age, and several other times during the growth phase. After being weighed, each calf's weight is compared to the growth standards to determine if they will be allowed to continue with the program. If, at any point, the calves fail to meet the growth standards, they are preferably removed from the program.

Once the calves meet a minimum growth rate, they may be transferred to the finishing-yard and are fed and treated according to the finishing protocol. The calves are also preferably prepared for slaughter according to the finishing protocol. Finally, the calves may also be slaughtered and the resulting meat products handled according to the finishing protocol.

BRIEF DESCRIPTION OF THE DRAWINGS

A preferred embodiment of the present invention is described in detail below with reference to the attached drawing figures, wherein.

DETAILED DESCRIPTION OF A PREFERRED EMBODIMENT

Figure 1:
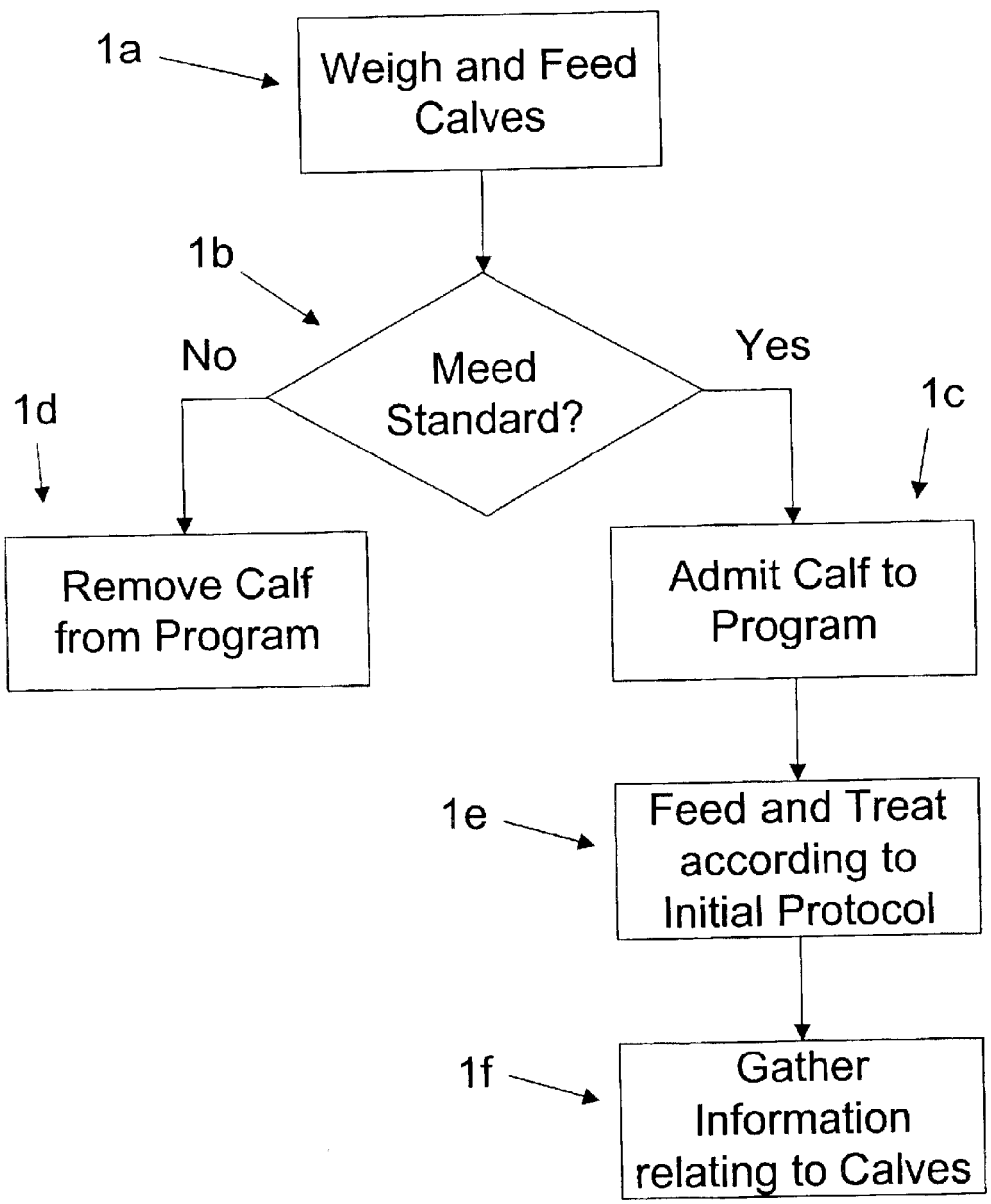
FIG. 1 is a flow chart showing a preferred initiation phase of a quality assurance program in accordance with a preferred embodiment of the present invention.

The preferred quality assurance program and method for consistently producing high quality meat products in accordance with the present invention broadly comprises selecting a plurality of calves or other animals that meet a set of standards and managing the calves according to a set of protocols. The set of standards preferably include initiation standards and growth standards that are used to cull out low quality calves expected to yield low quality meat products. If, at any point, any of the calves fail to meet the standards, that calf is preferably removed from the program. Thus, only calves of high quality are admitted into and remain with the program. The set of protocols preferably include an initiation protocol, a growth protocol, and a finishing protocol to ensure the calves are properly nurtured so that they may yield high quality meat products.

The program may be broken down into three growth phases, such as an initiation phase in which the calves are managed during their first weeks, a growth phase in which the calves are managed during their growth, and a finishing phase in which the calves are managed leading up to slaughter. The initiation phase preferably occurs at a calf ranch where the calves are born and includes selecting only calves that meet the initiation standards.

The initiation standards are preferably applied during the initiation phase and preferably include requirements relating to the calves' genetics. For example, the calves are preferably selected from a preferred breed of cattle that has been bred with consistent genetics, such as a dairy breed. More specifically, Holstein cattle have been bred for specific physical characteristics, such as milk production and stature. Breeding specifically for these characteristics has produced consistent genetics and made currently available Holstein cattle the preferred breed for use with the program.

The calves are also preferably selected according to other requirements specified in the initiation standards. For example, the calves preferably meet a minimum birth weight of approximately eighty-five pounds, which is an indicator of the calves' health. Other indicators of health may also be used as requirements and included in the initiation standards.

While at the calf ranch, the calves are preferably managed according to the initiation protocol which preferably dictates how the calves are fed. For example, each calf is preferably removed from its mother and fed four quarts of a high quality colostrum within thirty minutes of birth. The calves are preferably fed two more quarts of the colostrum during the first twenty-four to thirty-six hours of birth. Beginning on day three, the calves are preferably given a milk replacer, a starter feed, and access to water. It is important to note that all feeding pails, bottles, and other utensils are preferably fully cleaned and sanitized between each feeding. Additionally, the calves are preferably prevented from feeding on forage during these early days.

The initiation protocol may also dictate that the calves are weaned when they consume at least one and one half pounds of the starter feed for at least three consecutive days. The calves are preferably not moved for at least five days after weaning, in order to prevent them from becoming agitated. Once the calves weigh at least one hundred and fifty pounds, they may be switched to a grower feed and proceed to the growth phase.

The initiation protocol also preferably dictates vaccinations and other treatments given to the calves within the first twenty-four hours. For example, the calves are preferably vaccinated for diseases caused by bacteria, such as *e.coli*, *salmonella*, and *pasteurella* by giving them one half dose of ENDOVAC-Bovi®, or similar vaccine. The calves are also preferably vaccinated against viral infections by giving them a full dose of TSV-II®, or similar vaccine. Each calf's naval is preferably dipped in a seven percent iodine solution in order to prevent naval infections. Blood samples are also preferably taken from each calf in order to perform a blood protein serum analysis. The calves are also preferably weighed and tagged with all relevant information relating to the calves being recorded.

The initiation protocol preferably also dictates other vaccinations and treatments be given to the calves at other times. For example, the calves are preferably given another one half dose of ENDOVAC-Bovi, castrated, and dehorned on their tenth day. Additionally, another blood sample may be taken from each calf on their tenth day in order to perform another blood protein serum analysis. The calves are preferably vaccinated for diseases, such as Infectious Bovine Rhinotracheitis (IBR), Bovine Virus Diarrhea (BVD), Parainfluenza 3 ($PI_3$), and Bovine Respiratory Syncytial Virus (BRSV) on their thirtieth day by giving them a dose of Titanium® 5, or similar vaccine. The dose of Titanium® 5 can also be used to vaccinate the calves against respiratory disease caused by *Pasteurella haemolytica* and *Pasteurella multocida*. The calves are preferably vaccinated for diseases caused by Clostri-dium chauvoei (Blackleg), septicum (Malignant edema), novyi (Black disease), sordellii and per-fringens (Enterotoxemia) on their forty-fifth day by giving them a dose of Vision® 7, or similar vaccine. The calves are also preferably given another dose of Titanium® 5 on their forty-fifth day.

The initiation protocol preferably also dictates other practices, such as socializing the calves, once they have been weaned. Thirty days after being weaned, the calves are preferably given a dose of Titanium® 5+5×Lepto, or similar vaccine, which also protects them from leptospirosis.

Finally, the initiation protocol preferably dictates vaccinations given to the calves before they are allowed to proceed to the growth phase. For example, the calves are preferably given another dose of Titanium® 5 and Vision® 7 three weeks prior to shipment to a grow-yard. Additionally, each calf is preferably weighed and the information relating to each calf is preferably updated just before shipment to the grow-yard where the calves begin the growth phase.

Once the calves arrive at the grow-yard, they are preferably treated according to the growth protocol. For example, the calves are preferably immediately unloaded and inspected for illness or injury. Feed and water are also preferably immediately made available to the calves. If the calves are to be kept in bunks, then eight pounds of the grower feed is preferably made available in each bunk. Alternatively, if the calves are to be kept in pens, then self-feeders in the pens are preferably stocked with the grower feed.

The growth protocol preferably also dictates vaccinations and treatment for the calves' first forty-eight hours after arrival at the grow-yard. For example, an electrolyte vitamin, such as Bovine Bluelite™, is preferably mixed with the water available to the calves, in order to re-hydrate the calves. The calves are also preferably given another dose of Titanium®5 and Vision®7. The calves are also preferably weighed and the information relating to each calf is preferably updated.

The growth protocol preferably also dictates vaccinations and treatment given to the calves after approximately two weeks at the grow-yard. For example, the calves are preferably given another dose of Titanium® 5 and Vision® 7. The calves are also preferably implanted with Encore, or similar implant, in order to enhance the calves growth. The growth protocol may also dictate that the calves be given various antibotics, such as Mycotil®, Baytril®, Penicillin, and Liquamycin®. The calves may also be given Nuflor® as treatment for bovine respiratory disease (BRD) or foot rot.

The growth protocol may also dictate that the calves are weighed frequently and the information relating to each calf is updated frequently, to insure the calves continue to meet the growth standards. For example, the calves are expected to weigh at least two hundred pounds by twelve weeks of age. The calves are also expected to weight at least three hundred pounds by seventeen weeks of age. Once the calves consistently maintain a two and one half pound per day growth rate, they may be shipped to a finishing-yard where they begin the finishing phase.

The finishing protocol preferably dictates vaccines and treatment given to the calves approximately forty-eight hours after arrival at the finishing-yard. For example, the calves are preferably given another dose of Titanium® 5 and Vision® 7 in order to prevent enterotoxemia (overeating disease). The calves are also preferably weighed and the information relating to each calf is updated. Additionally, the calves are preferably implanted with an antibiotic implant, such as Ralgo or Component®-TES, approximately ninety days before being slaughtered.

The finishing protocol may also dictate how the calves are slaughtered and how the resulting meat products are handled. For example, the finishing protocol may As discussed above, the information relating to the calves is preferably updated each time some action is taken with respect to the calves. The information is preferably recorded individually and reflects each calf's entire history from their birth to being loaded for transportation to a slaughter facility. While it is possible to record and store the information in paperfiles, the information is preferably recorded and stored in a computer-based livestock information system.

For example, the system described in co-pending application "INFORMATION SYSTEM AND METHOD FOR GATHERING INFORMATION RELATING TO LIVESTOCK", Ser. No. 10/278,876, filed Oct. 22, 2002, incorporated herein by reference, is ideal for use with the program. Such systems make the information easy to analyze and share. Analyzing the information allows for easy discrimination of poor and under performing calves so that they may be culled out in order to ensure only high quality meat products are produced through the program. Sharing the information allows interested parties to research histories of meat products they purchase and/or consume.

Consistently selecting and managing calves according to the program consistently produces high quality meat products and elevates those meat products above simple commodities. Additionally, quality conscious consumers want to be assured of quality. Thus, documenting the calves progression through the program in a manner that allows such consumers to access the information, assures those consumers that they are purchasing high quality meat products building product name recognition and brand loyalty.

While the present invention has been described above, it is understood that other standards and/or protocols can be substituted. For example, an all natural program may modify the protocol such that no drugs or implants are given to the calves. Additionally, the program may be used with other livestock, such as sheep, swine, or poultry. These and other minor modifications are within the scope of the present invention.

Figure 2:
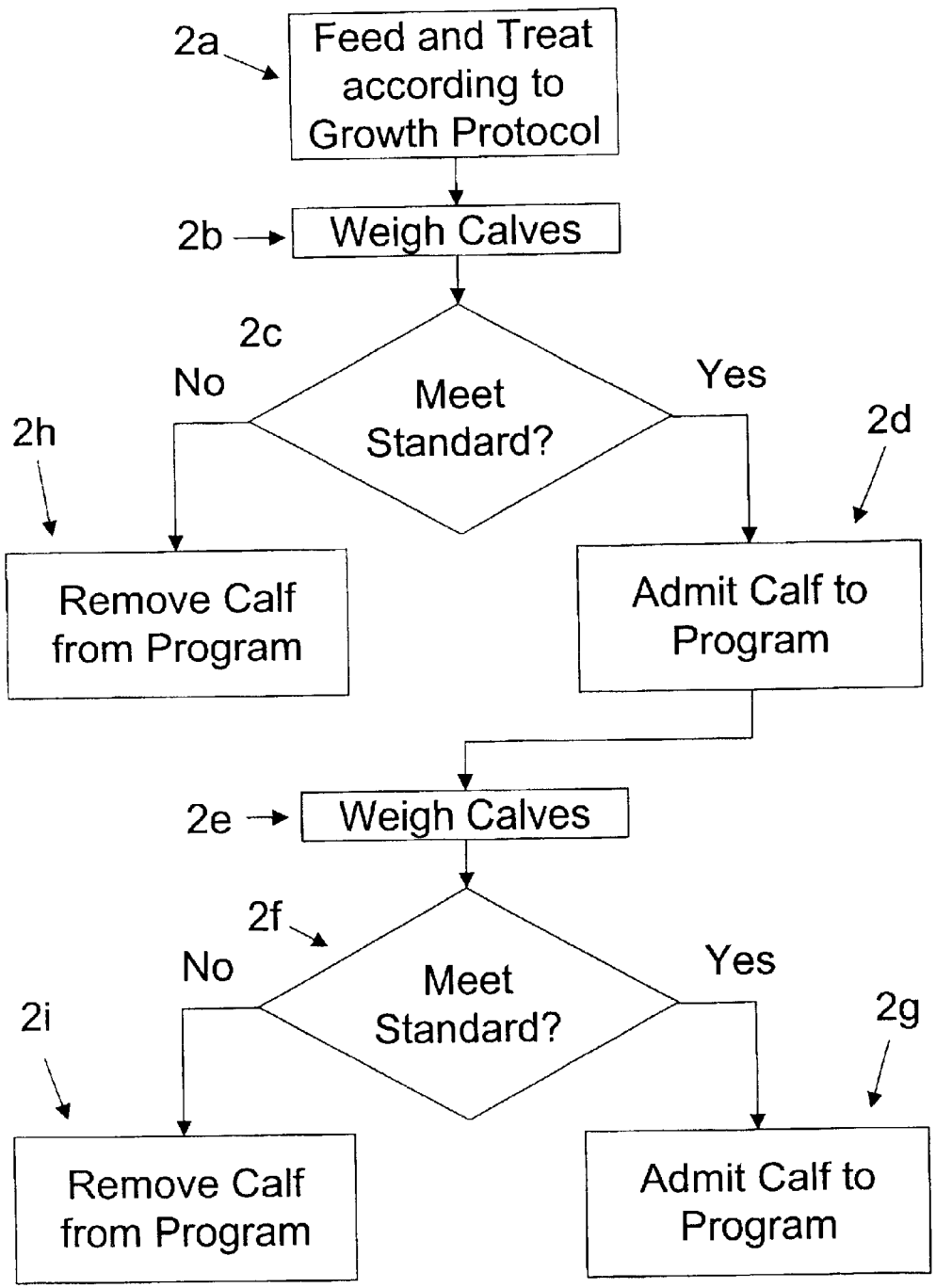
FIG. 2 is a flow chart showing a preferred growth phase of the program.
Figure 3:
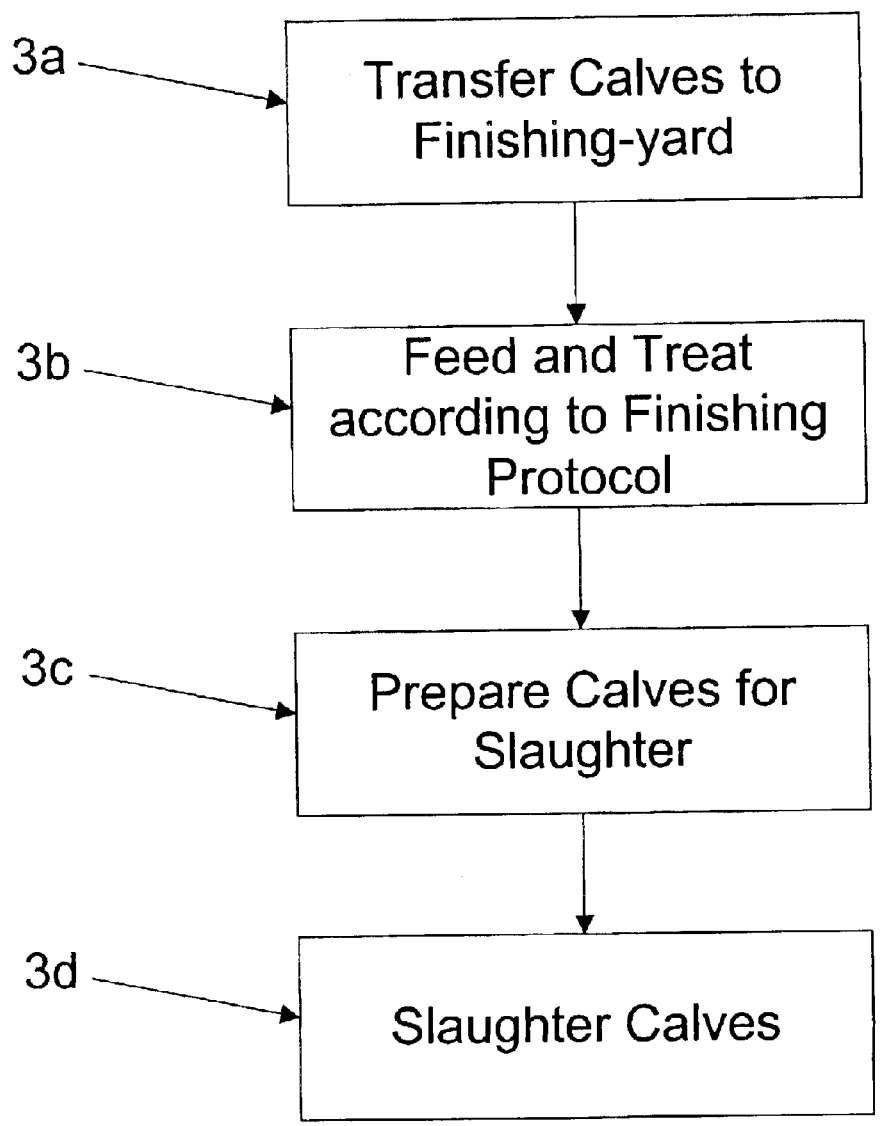
FIG. 3 is a flow chart showing a preferred finishing phase of the program.

The flow charts of FIGS. 1–3 show the functionality and operation of a preferred implementation of the present invention in more detail. In some alternative implementations, the functions noted in the various blocks may occur out of the order depicted. For example, two blocks shown in succession may in fact be executed substantially concurrently, or may sometimes be executed in the reverse order depending upon the functionality involved.

In use, for example and referring to FIG. 1, calves, of the selected breed, are preferably immediately weighed and then fed four quarts of the colostrum, as depicted in step 1a. Each calf's weight is compared to the minimum birth weight, as depicted in step 1b. If the calves meet the minimum birth weight, they may be admitted into the program, as depicted in step 1c. If the calves fail to meet the minimum birth weight, they are removed from the program, as depicted in step 1d. During the initiation phase, the calves are fed and treated according to the initiation protocol, as depicted in step 1e. Information relating to each of the calves is also gathered during the initiation phase, as depicted in step 1f.

Referring also the FIG. 2, when the calves arrive at the grow-yard, they are fed and treated according to the growth protocol, as depicted in step 2a. The calves are preferable weighed at approximately twelve weeks of age, as depicted in step 2b. Each calf's weight is compared to a minimum twelfth week weight from the growth standards, as depicted in step 2c. If the calves meet the minimum twelfth week weight, they are allowed to continue with the program, as depicted in step 2d. The calves are also preferable weighed at approximately seventeen weeks of age, as depicted in step 2e. Each calf's weight is compared to a minimum seventeenth week weight from the growth standards, as depicted in step 2f. If the calves meet the minimum seventeenth week weight, they are allowed to continue with the program, as depicted in step 2g. If, at any point, the calves fail to meet the growth standards, they are preferably removed from the program, as depicted in steps 2h and 2i.

Referring also to FIG. 3, once the calves meet a minimum growth rate, they may be transferred to the finishing-yard, as depicted in step 3a. At the finishing-yard, the calves are fed and treated according to the finishing protocol, as depicted in step 3b. The calves are also preferably prepared for slaughter according to the finishing protocol, as depicted in step 3c. Finally, the calves are slaughtered, as depicted in step 3d. The finishing protocol may also dictate the manner in which the calves are slaughtered, how the meat products are handled, or both.

Having thus described a preferred embodiment of the invention, what is claimed as new and desired to be protected by Letters Patent includes the following:

What is claimed is:

1. A method of consistently producing quality meat products by managing growth of a plurality of calves through a growth management program, the method comprising the steps of:

establishing standards for participation in the program, the standards including—a minimum birth weight, a minimum twelfth week weight, a minimum seventeenth week weight, and a minimum growth rate;

culling out calves that fail to meet the standards; and implementing a growth protocol for the non-culled calves.

2. The method as set forth in claim 1, wherein the minimum birth weight is approximately eighty-five pounds.

3. The method as set forth in claim 1, wherein the minimum twelfth week weight is approximately two hundred pounds.

4. The method as set forth in claim 1, wherein the minimum seventeenth week weight is approximately three hundred pounds.

5. The method as set forth in claim 1, wherein the minimum growth rate is approximately two and one half pounds per day.

6. The method as set forth in claim 1, wherein the growth protocol includes requirements concerning types of feed given to the calves.

7. The method as set forth in claim 1, wherein the growth protocol includes requirements concerning vaccinations given to the calves.

8. A method of consistently producing quality meat products by managing growth of a plurality of calves through a growth management program, the method comprising the steps of:

establishing standards for participation in the program, including—a minimum birth weight of approximately eighty-five pounds, a minimum twelfth week weight of approximately two hundred pounds, a minimum seventeenth week weight of approximately three hundred pounds, and a minimum growth rate of approximately two and one half pounds per day;

culling out calves that fail to meet the standards; and implementing a growth protocol for the non-culled calves, including—requirements concerning types of feed and vaccinations given to the calves.

9. A method of consistently producing quality meat products by managing growth through a growth management program, the method comprising the steps of:

selecting only Holstein calves;

establishing standards that each of the calves must meet for further participation in the program, the standards including—a minimum birth weight, a minimum twelfth week weight, a minimum seventeenth week weight, and a minimum growth rate;

implementing a growth protocol for the calves; and culling out calves that fail to meet the standards.

10. The method as set forth in claim 9, wherein the minimum birth weight is approximately eighty-five pounds.

11. The method as set forth in claim 9, wherein the minimum twelfth week weight is approximately two hundred pounds.

12. The method as set forth in claim 9, wherein the minimum seventeenth week weight is approximately three hundred pounds.

13. The method as set forth in claim 9, wherein the minimum growth rate is approximately two and one half pounds per day.

14. The method as set forth in claim 9, wherein the growth protocol includes requirements concerning types of feed given to the calves.

15. The method as set forth in claim 9, wherein the growth protocol includes requirements concerning vaccinations given to the calves.

16. A method of consistently producing quality meat products by managing growth through a growth management program, the method comprising the steps of:

selecting only Holstein calves;

establishing standards that each of the calves must meet for further participation in the program, the standards including—a minimum birth weight of approximately eighty-five pounds, a minimum twelfth week weight of approximately two hundred pounds, a minimum seventeenth week weight of approximately three hundred pounds, and a minimum growth rate of approximately two and one half pounds per day;

implementing a growth protocol for the calves that continue to meet the standards, wherein the growth protocol includes requirements concerning vaccinations and types of feed given to the calves;

associating with the program only the calves that continue to meet the standards; and removing from the program any calves that fail to meet the standards.

\* \* \* \* \*